Patented Jan. 23, 1940

2,187,766

UNITED STATES PATENT OFFICE 2,187,766

THERAPEUTIC COMPOSITION

Charles C. Whittier, Chicago, Ill., assignor, by mesne assignments, to Standard Chemical and Mineral Corporation, Chicago, Ill., a corporation of Delaware No Drawing. Application December 10, 1936, Serial No. 115,161

10 Claims. (Cl. 167—74)

This invention relates to products and methods of making them for the treatment, healing and cure of injured and defective tissues and cells of human beings and other animals. This invention is an outgrowth and carrying forward of the art of maggot therapy represented by the use of live maggots and the discovery of Dr. Stanton Knowlton Livingston described in his Patent No. 2,022,890 of December 3, 1935, that an effective extract may be made from maggots with beneficial effects in the cure of wounds.

The main object of the present invention is to provide an improved chemical and physical composition, and an improved method of manufacture, of products employed in the treatment of wounds, infections and irritations of animal tissues, whereby the products will have superior qualities and characteristics and be sufficiently stable to maintain these characteristics indefinitely and thereby render the products available for commercial handling and sale, so as to be readily accessible to all users.

It is a matter of common knowledge that larvae are among the most vigorous of the elementary common forms of life structure and it has been known for centuries that when certain wounds or breaks in the continuity of living structures become infested with larvae, rapid healing and closure of the wound takes place. This fact was noted by Ambrose Pare about 1590. Napoleon's surgeon, Dominique Jean Larrey and other physicians in France did definite experimental work with larvae.

Dr. W. W. Keen noted the beneficial effects of larvae (maggots) in the wounds of soldiers during the Civil War. Dr. W. S. Baer of Johns Hopkins University made a scientific study of the same phenomena during and after the World War.

All the above, except the Livingston disclosure, relate to the use of living maggots in the injured tissues.

The use in curative processes of macerated maggots as a substitute for living maggots, and the value of allantoin, an excretion of maggots, in the treatment of wounds, have been described by Dr. William Robinson in Circular #357, issued April, 1935, by the United States Department of Agriculture, Bureau of Entomology and Plant Quarantine, Washington, D. C.

I have discovered that not only is the presence of the maggot material beneficial to the healing of wounds as described in the literature but that the entire maggot, when ground to colloidal fineness, can be employed to a greater degree of advantage.

The maggot colloid acts as a protoplasmic stimulant to excite the cell tissues about the wound in the performance of their normal and natural functions of building up new tissues, and the molecular ingredients of the embryonic cell structure of the maggots themselves appear to provide directly assimilable food ingredients for the living cells and serve as properly constituted materials available to promote the growth of the tissues and repair of damaged ones. Healing is the restoration of wounded parts.

When maggots are ground up into particles of colloidal fineness, their tissue cells are disintegrated physically but are chemically complete with molecular composition unaltered. The finer the grinding, the greater the availability of the material for assimilation into the adjacent living body cells and for combination with the serum excreted by these cells and out of which the granulation tissue formation that fills up the wound is built.

This colloidal material is not injured by cooking but on the contrary clinical tests conclusively demonstrate that it is improved by heating it on a water bath up to 95° C.

In order that this colloidal mass may be maintained in a stable condition of availability for use over an indefinite period of time, it is essential that it be not only sterile but that it be combined with certain chemicals that not only prevent bacterial contamination but also prevent molecular deterioration. These chemicals, however, and the degree of their concentration in the compound must be carefully selected and proportioned to reduce to a minimum any deleterious effect they might have upon the living tissues.

To this end these preservative and bacteria destroying chemicals are adjusted in the herein-described compounds according to the use for which each respective compound is designed. Their relative proportions in the mass of the compound are such that when they have served their purpose of destroying bacteria in the infected tissues and are diluted by the serum excreted by the living healthy cells, they will not injure the latter. A compound designed for use as a skin lotion will require less active antiseptic properties to be effective than one designed for infected wounds.

The maggot itself is a living antiseptic. Maggots of different species of Diptera can be used but preference is given to the species known as *Lucilia sericata* and *Calliphora erythrocephala*.

The present invention contemplates the preparation of the maggot material in uniform colloidal form. And the combination of this colloid with other chemicals and materials renders it best available for the therapeutic uses to which it is applicable.

One form in which it finds a large field of utility is a form in which the colloidal maggot material is suspended in a physiological saline solution, by which means it is available as a surgical dressing for bathing the wounds, as for instance, where it is desirable to have a continuous drip of a solution.

Another embodiment that is contemplated by this invention is that of a concentrate which is used as a base in the preparation of numerous specific compositions which will be hereinafter described.

The uses to which these maggot preparations are applicable are many. The maggot colloid seems to serve as both medicament, growth stimulant and food for the living tissues with which it comes in contact. Among the various injuries, infections, and ailments for which these compositions have been found useful are burns of all kinds, ulcers, wounds, skin grafts, gangrene, infections, osteomyelitis, hemorrhoids, and irritations of the skin and tissues and membranes of the animal body.

Some authorities have ascribed the curative value of the maggot to allantoin and have suggested the use of allantoin as a substitute for maggot therapy. I believe, however, that this is but one of many valuable ingredients or attributes of the maggot substance and that these attributes are available to the maximum degree when the maggot substance is used in a colloidal form.

The natural allantoin contained in this maggot colloid is more effective, I believe, than any synthetic allantoin. Furthermore, all the other useful ingredients of the maggot, that is, the protein, amino acids, nuclear proteids, nucleic acid, the nitrogenous and mineral compounds, urine, urea, uric acid and the like; the compounds of sulphur, especially sulphhydryl, phosphorus, calcium, and, in fact, the complete range of protoplasmic substances are available in usable growth-promoting and healing forms in the hereindescribed colloid.

Due to the natural catalysts, enzymes, urease and the like, that are present in the colloidal maggot, the allantoin and the other nitrogenous compounds in this product are more effective than synthetic chemical allantoin in the absence of such catalysts.

However, in order to produce a standard product and compensate for variation in the amount of allantoin that might occur in different growth of different maggots, an additional portion of chemical allantoin (synthetic or natural) may be added.

The colloidal maggot substance when examined in dilute form under a microscope shows the rambling movement known as Brownian motion. This Brownian movement, I understand, is due to a constant exchange of electrical energy in the form of negative and positive electricity. This energy exchange is, I believe, at least one cause of the stimulation of living cells with which the material is brought into contact and which produces the observed rapid growth of the living cells and tissue and of normal granulations in the healing of wounds treated with the maggot colloid. The Brownian movement is evidenced in each of the hereindescribed compositions when properly diluted and the activity does not seem to vary with the acid concentration, although the lower pH in some samples seems to favor the motion. In all of the samples that I have examined for Brownian movement, the movement appeared to originate in small particles held in suspension which, I believe, are the mineral and protein particles.

In order to provide for complete sterilization of the maggot compound and a desirable degree of sterilization of the wounded tissues to which the medicament is to be employed, I prepare my therapeutic composition with certain antiseptic ingredients, preferably oxyquinoline sulphate which is selected because of the fact that it is non-irritating and non-toxic and combines well with proteins.

Other antiseptic substances that are sometimes desired for alternatives for oxyquinoline sulphate are acriflavin and proflavin which are also active in the presence of protein. I believe that it is better to employ such substances than to employ mercury, chlorine, phenol derivatives and the like which are incompatible with proteins.

In order to alleviate pain and suffering, without interfering with healing and growth, I combine with the maggot substance a carefully proportioned anesthetic ingredient. For this purpose I prefer chlor-butanol because of its non-toxic and non-irritating qualities. As substitutes for this, ethyl aminobenzoate, benzyl alcohol, butyn, eucupin dihydrochloride, may be used for particular applications.

The maggot colloid may be variously compounded with chemicals and carrier substances appropriate for the treatment of the different kinds of afflictions for which it is useful and the following are examples of such compositions and the methods employed in making them.

EXAMPLE 1

*Making of liquid product. (Preferred way)*

The live maggots are washed in a tenth normal sodium hydroxide solution where they remain five to ten minutes. They are then thoroughly rinsed with distilled water and placed in a mercury bichloride solution (1:1000) for five to ten minutes. Then they are again thoroughly rinsed with distilled water. The cleaned and sterilized maggots are then ground to colloidal fineness in a colloid mill with appropriate quantity of physiological saline solution (U. S. P.) and this colloid product from the colloid mill is discharged into a glass container of suitable size containing appropriate proportions of calcium gluconate, boric acid, chlorbutanol and oxyquinoline sulphate. The mass is frequently shaken during a twenty-four hour period after which it is filtered through a coarse filter paper. The filtrate is then ready for use.

A preferred composition is one containing

| | Per cent |
|---|---|
| Colloidal maggots | 5 |
| Boric acid | 4 |
| Calcium gluconate | 0.5 |
| Chlorbutanol | 0.5 |
| Oxyquinoline sulphate | 0.4 |
| Physiological saline solution | 89.6 |

EXAMPLE 2

*Making a maggot concentrate*

The cleaned and sterilized maggots (same as in making liquid) are ground to colloidal fineness in a colloid mill with appropriate amount of glycerine. This product is discharged into a suitable glass container in which has previously been placed appropriate quantities of the other chemicals and shaken up occasionally for a period of twenty-four hours. It is then placed on a water bath at 95° C. and cooked for two hours. The resulting maggot concentrate contains 70% maggots, 0.2% oxyquinoline sulphate, 8% boric acid and 21.8% glycerine. This concentrate is the standard base substance that is combined with other chemicals in compounding various specific compositions designed for various special uses.

The essence of this invention lies in the employment of embryonic cell material, particularly diptera in maggot state, ground to colloidal fineness. Various compositions of proven clinical value have been specified to enable those skilled in the therapeutic art to make practical use of the invention.

It will, however, be apparent that the various antiseptic, anaesthetic, healing and carrier chemicals entering into the specified compositions may be varied as to proportion and substitutions of other chemicals for those specified may be made without departing from the spirit of this invention as defined by the following claims.

I claim:

1. A therapeutic product comprising a stable composition of maggots ground to such degree of comminution as to disintegrate the individual cell structure, an acid antiseptic and anaesthetic.

2. A therapeutic composition comprising 70% of maggots ground to such degree of fineness as to disintegrate the individual cell structure, 21.8% of glycerine, 8% of boric acid and 0.2% of oxyquinoline sulphate.

3. A therapeutic composition comprising 5% maggots ground to such a degree of comminution as to disintegrate the individual cell structure, 4% boric acid, 0.5% calcium gluconate, 0.5% chlorbutanol, 0.4% oxyquinoline sulphate, and 89.6% physiological saline solution.

4. A therapeutic product comprising a stable composition of maggots ground uniformly to such minute degree of comminution as to exhibit Brownian movement in solution, and an acid antiseptic medium.

5. A therapeutic composition comprising maggots ground alive in physiological saline solution to a degree of comminution such as to disintegrate the individual cell structure of the maggot tissue, and an acid antiseptic.

6. A therapeutic composition comprising maggots ground alive in glycerine to a degree of comminution such as to disintegrate the individual cell structure, and an acid antiseptic.

7. A therapeutic product comprising a stable composition of *Lucilia sericata* maggots ground uniformly to such minute degree of comminution as to exhibit Brownian movement in solution, and an acid antiseptic.

8. The method of making a stable therapeutic composition which consists in submerging living maggots in a bath of glycerine, grinding them in the glycerine to such minute degree of comminution as will disintegrate the individual cell structure of the maggot tissue, and incorporating into the composition an acid antiseptic.

9. The method of making a stable therapeutic composition which consists in submerging living maggots in a bath of glycerine, grinding them in the glycerine to such minute degree of comminution as will disintegrate the individual cell structure of the maggot tissue, and incorporating into the composition appropriate quantities of the hereinmentioned ingredients to produce substantially the proportions of 70% of maggots, 21.8% of glycerine, 8% of boric acid and 0.2 of oxyquinoline sulphate.

10. The method of making a stable therapeutic composition which consists in submerging living maggots in a bath of liquid, grinding them in the liquid to such minute degree of comminution as will disintegrate the individual cell structure of the maggot tissue, and incorporating into the composition an acid antiseptic medium.

CHARLES C. WHITTIER.